United States Patent [19]  [11]  4,261,467
Shariff et al.  [45]  Apr. 14, 1981

[54] SHIPPING COVER FOR MOTOR CONTROL CENTER

[75] Inventors: Sadiq A. Shariff, Palos Park; Brij M. Bharteey, Bolingbrook; Neal E. Rowe, Oak Forest, all of Ill.

[73] Assignee: Westinghouse Electric Corp., Pittsburgh, Pa.

[21] Appl. No.: 103,135

[22] Filed: Dec. 13, 1979

[51] Int. Cl.³ .................. B65D 81/02; B65D 85/30
[52] U.S. Cl. .................. 206/523; 220/23.8; 206/328; 206/525; 200/333
[58] Field of Search ............... 220/23.4, 23.8; 206/523, 525, 328; 312/320; 200/333; 361/356

[56] References Cited
U.S. PATENT DOCUMENTS

| | | | |
|---|---|---|---|
| 3,048,267 | 8/1962 | Starzec | 206/523 X |
| 3,523,608 | 8/1970 | Miller | 220/23.8 X |
| 4,142,224 | 2/1979 | Wilson et al. | 361/356 |

Primary Examiner—George T. Hall
Attorney, Agent, or Firm—L. P. Johns

[57] ABSTRACT

A shipping cover for a motor control center characterized by a motor control center having a panel surface from which projects a handle and a handle knotting frame, and a shipping cover therefor characterized by spaced walls forming cavity means for enclosing the assembly of the handle and frame which walls engage the surfaces of the handle and frame to effect a friction fit between the cover and the assembly.

8 Claims, 10 Drawing Figures

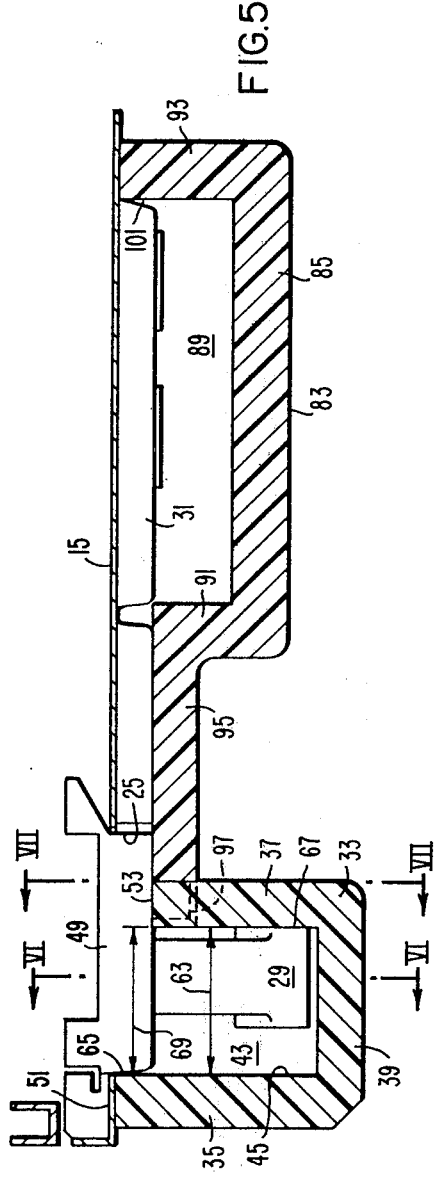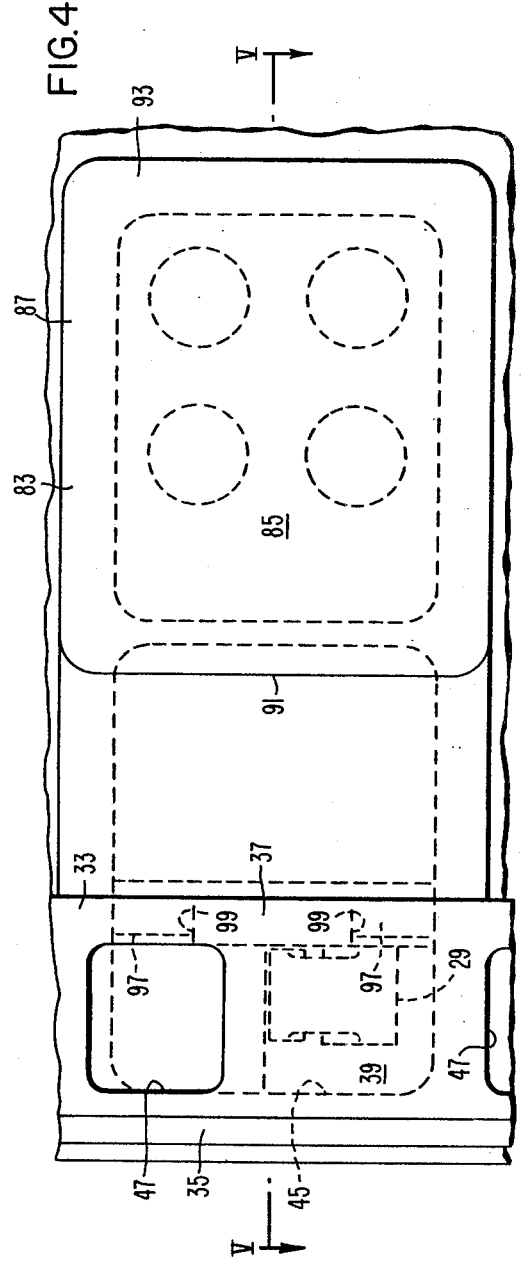

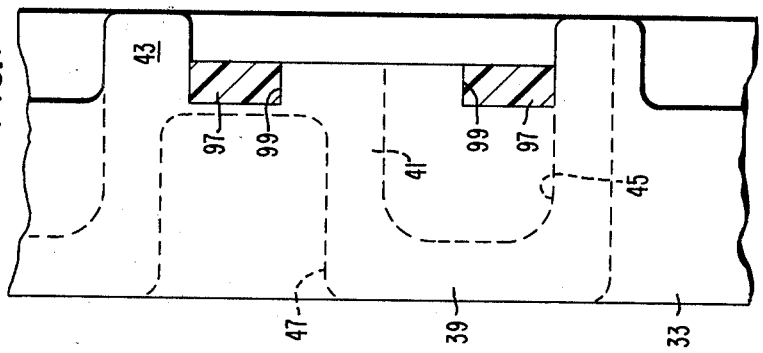
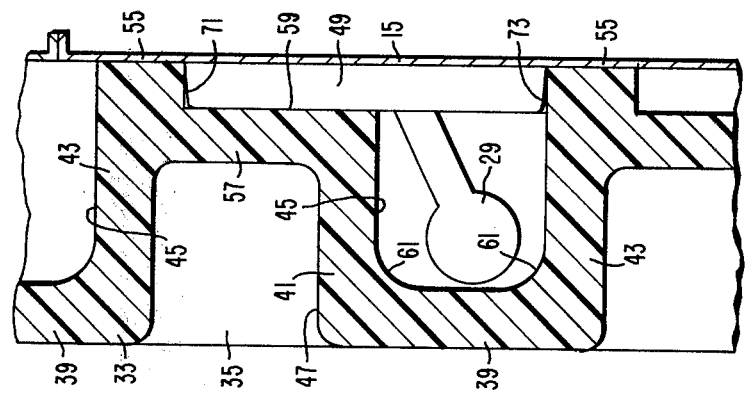

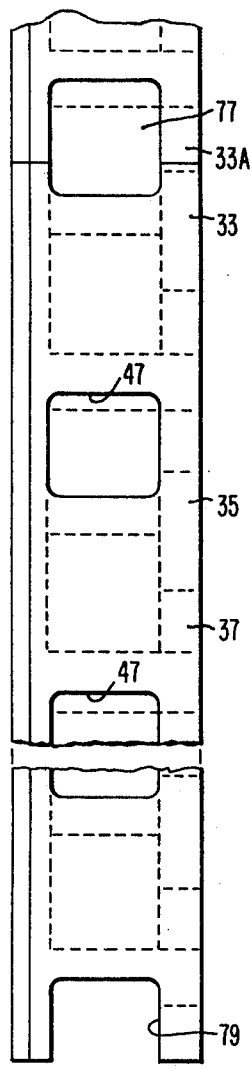
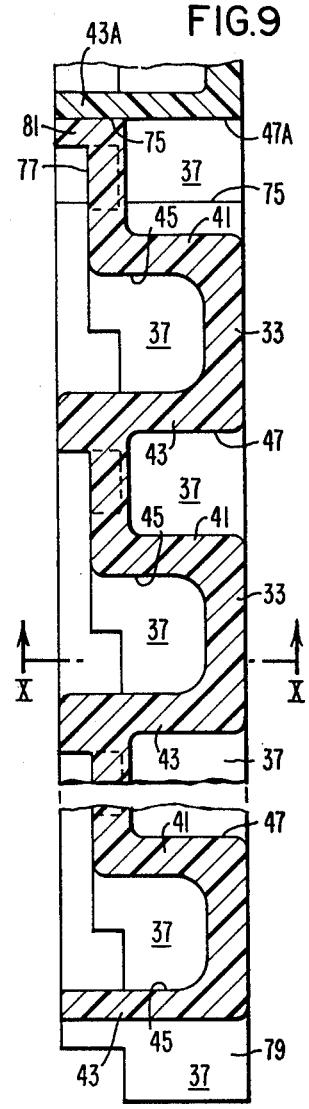
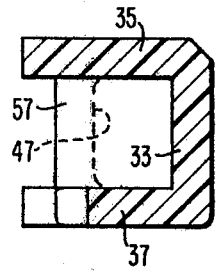

SHIPPING COVER FOR MOTOR CONTROL CENTER

BACKGROUND OF THE INVENTION

1. Field of the Invention

This invention relates to a protective shipping cover for parts extending from a panel of an electrical apparatus and, more particularly, it pertains to a molded expanded styrene cover having compartments into which the parts extend during shipment.

2. Description of the Prior Art

Motor control centers of current construction comprise rectangular box-like units having outer surface panels from which project operating members such as handles and mounting frames for the handles. Unless protective covers are provided the handles are often subject to damage during shipment, particularly because the handles of current construction are comprised of plastic parts. Heretofore, protective covers composed of cardboard or expanded styrene have been unsatisfactory for protection of the handles.

SUMMARY OF THE INVENTION

It has been found in accordance with this invention that the foregoing problem may be overcome by providing an electric control center of the type having a front door panel with spaced aligned openings through each of which extends an assembly of an outwardly projecting handle and a handle housing which housing and handle comprise edges extending substantially normal to the panel surface, a protective shipping cover detachably mounted on the panel and over the handles, the cover being coextensive with the aligned openings and abutting the panel surface, the cover having spaced walls forming cavity means for enclosing the handles, the spaced walls being separated by a distance substantially equal to the distances between the normal surfaces of the assembly to effect a friction fit between the cover and the assembly.

The advantage of the shipping cover of this invention is that it is comprised of lightweight expanded styrene material which completely encloses all parts projecting from the outer surface of a motor control center so that during shipment, any impact that would otherwise damage the parts is diverted to the cover.

BRIEF DESCRIPTION OF THE DRAWINGS

FIG. 4 is an enlarged fragmentary view showing the protective covers mounted over the several controls on the front of the panel;

FIG. 5 is a horizontal sectional view taken on the line V—V of FIG. 4;

FIG. 6 is a vertical sectional view taken on the line VI—VI of FIG. 4;

FIG. 7 is a vertical sectional view taken on the line VII—VII of FIG. 5;

FIG. 8 is a plan view of a section of the protective cover of this invention;

FIG. 9 is a vertical sectional view taken on the line IX—IX of FIG. 8; and

FIG. 10 is a horizontal sectional view taken on the line X—X of FIG. 8.

DESCRIPTION OF THE PREFERRED EMBODIMENT

Figure 2:
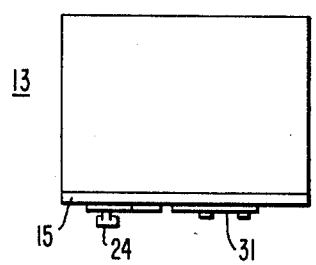
FIG. 2 is a plan view of the motor control center showing the manner in which handles and other controls extend from the front panel.
Figure 1:
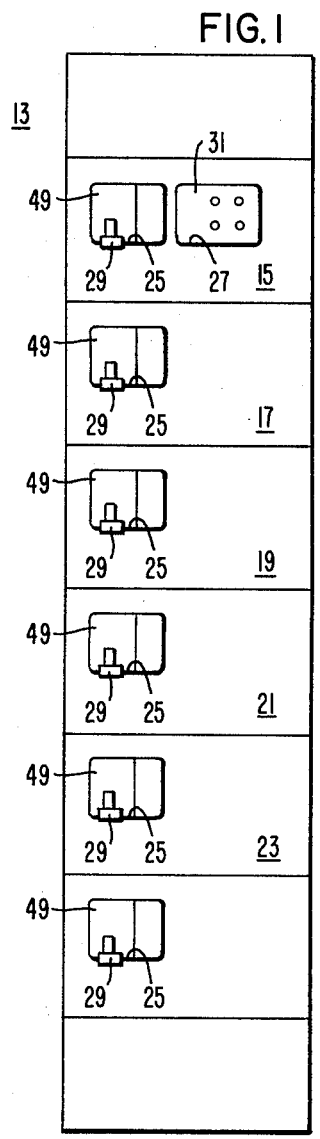
FIG. 1 is an elevational view of a front panel of a motor control center having a plurality of circuit breaker handles extending therefrom.

The electric control center of this invention is generally indicated at 13 in FIG. 1 and comprises a metal cabinet having a plurality of vertically spaced compartments for which access doors 15, 17, 19, 21, and 23 are provided as shown. The doors are provided with aligned grid openings 25 and 27 to accommodate portions of circuit breakers, such as handles 29, or indicator light panel 31 as required. The electric control center 13 is similar to that disclosed in U.S. Pat. No. 4,142,224.

Figure 3:
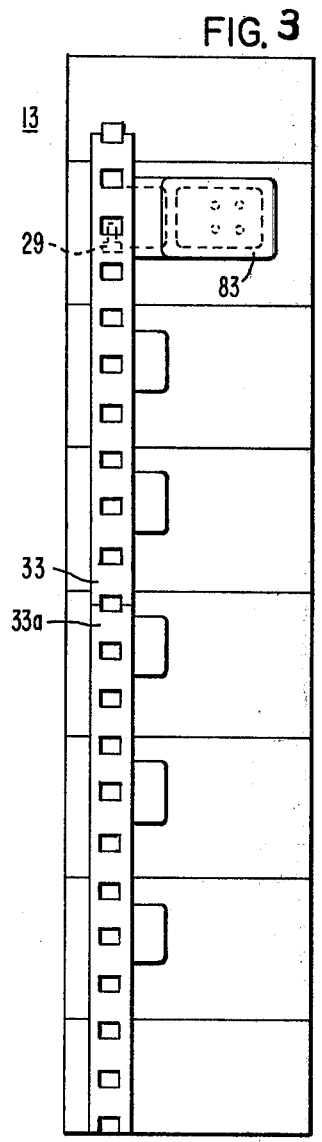
FIG. 3 is an elevational view of a motor control center having a protective shipping cover mounted thereon.

In accordance with this invention as shown in FIG. 3, a protective shield or cover 33 is mounted on the front panel of the control center 13 and over the several aligned handles 29 to protect the handles from damage during handling and shipment of the control centers 13.

The cover 33 is an elongated member comprised of one or more interfitting segments that are substantially coextensive with the vertical height of the control center 13 (FIG. 3). The cover 33 comprises a pair of laterally spaced walls 35, 37 (FIG. 5) as well as an outer intermediate wall 39 extending between the walls 35, 37. A pair of longitudinally spaced walls 41, 43 (FIG. 6) extend between the laterally spaced walls 35, 37 and form therewith a separate cavity for compartment 45 for each handle 29.

Moreover, as shown in FIGS. 4, 6, 8, 9 and 10, an opening 47 is disposed in the outer wall 39 and between longitudinally spaced walls 41, 43. Thus, an opening 47 is disposed between each cavity or compartment 45 and faces in a direction opposite that of the compartment.

As shown in FIG. 5, the handle 29 is part of an assembly of the handle and a handle frame or housing 49 which extends through openings 25 on each door 15-23. The wall 35 abuts the door 15 at 51 and the wall 37 abuts the housing 49 at 53. In addition (FIG. 6), the walls 43 abut the door 15 at 55 and a wall 57 of the cover abuts the housing 49 at 59. Accordingly, any force applied to the outer walls of the cover 33 are directed against the several surfaces of abutment, thereby protecting the several handles 29.

In accordance with this invention, each compartment 45 has rounded corners or arches 61 (FIG. 6) to enhance the strength of the cover 33. In this manner, the arch-shaped compartments 45 are better able to withstand forces applied perpendicular to the outer wall 39 of the cover. As a result, any impulsion directed toward the handles 29 is absorbed by the cover 33 and directed through the several walls thereof to the surfaces of the doors and thereby preventing the handles from being damaged. Accordingly, when there is an impact on the cover 33, the handles 29 and the housings 49 are protected by the cover due to the transfer of the force of the impact to the surface of the doors.

Moreover, in accordance with this invention, the cover 33 is comprised of a lightweight material such as expanded polystyrene which is preferably formed by expanding polystyrene particles into a mold to form the elongated rigid cover 33. Inasmuch as expanded polystyrene has a very low density, the cover 33 is a lightweight material for which reason it is readily mounted in place as shown in FIG. 3. More particularly, as shown in FIG. 5, the distance between the inner surfaces of the walls 35, 37 as indicated by the arrow 63 is slightly less than the distance between a surface 65 of the housing 49 and a surface 67 on the right side of the handle 29, which distance is signified by an arrow 69. Accordingly, when the cover 33 is placed in position over the aligned handles 29, it is pressed into place until the walls 35, 37, 41 and 43 are pushed into abutment at 51, 53, 55, 59, whereupon due to slight resilience of the cover, the cover walls grip the surfaces 65, 67 to help hold the cover in place. In a similar manner, the housing 49 (FIG. 6) is gripped between the walls 43 at points 71, 73 to provide increased forces for holding the cover 33 in place.

As was set forth above, the shield or cover 33 may be comprised of one or more segments disposed in alignment. For example, two segments of covers 33 and 33A are shown in FIG. 3 which have parting surfaces 75. As shown more particularly in FIGS. 8 and 9, one end of each cover segment 33 includes a hook-like projection 77 at one end and a hook receiving notch 79 at the other end. When two cover segments 33, 33A (FIG. 9) are placed together as shown by parting surfaces 75, an out-turned flange 81 of the projection 77 abuts a wall portion 43A and with the projection 77 completes the repetitive structural pattern of the cover 33 which includes an opening 47A between the cover segments 33, 33A.

In addition, as shown in FIGS. 3, 4 and 5, a second shield or cover 83 is provided to protect the indicator light panel 31. The cover 83 is a generally rectangular member having an outer wall 85 that is coextensive with the light panel 31. In addition, the cover 83 has opposite side walls 87, 89, opposite end walls 91, 93 and an extension 95 leading from the end wall 91 to the wall 37 of the cover 33. A pair of similar tabs 97 extend from the left hand (FIGS. 4, 5) of the extension 95 into corresponding tab receiving notches 99 in the wall 37. The cover 83 is secured in place by a combination of means including the tabs 39 in the notches 99 and a tight fitting connection between the outer surfaces of the indicator light panel 31 and the walls 87-93 of the cover; such as at the abutment 101 between the end wall 93 and the panel 31 (FIG. 5).

In conclusion, a device of this invention provides protection from damage during handling and shipment of the control center.

What is claimed is:

1. In an electric control center of the type having a front door panel with spaced aligned openings through each of which extends an assembly of an outwardly projecting handle and a handle housing which housing and handle comprise edges extending substantially normal to the panel surface, the combination with the assembly of a protective shipping cover detachably mounted on the panel and over the handles, the cover being coextensive with the aligned openings and abutting the panel surface, the cover having spaced walls forming cavity means for enclosing the handles, and the spaced walls being separated by distances substantially equal to distances between the normal surfaces of the assembly to effect a friction fit between the cover and the assembly.

2. The shipping cover of claim 1 in which the spaced walls comprise a pair of laterally spaced walls engaging at least one of the laterally spaced edges of at least one of the housing and the handle and at least one of the spaced edges of another of the housing and handle.

3. The shipping cover of claim 2 in which the laterally spaced walls face each other.

4. The shipping cover of claim 2 in which the laterally spaced walls engage oppositely facing edges of the housing.

5. The shipping cover of claim 2 in which the laterally spaced walls engage oppositely facing edges of the housing and the handle.

6. The shipping cover of claim 1 in which the cavity means comprised a separate compartment for each handle, each compartment having an outer wall facing the plane of the panel and united with the spaced walls, and forming a rounded surface at the intersections of the spaced walls.

7. The shipping cover of claim 6 in which a recess is disposed in the cover between each spaced compartment.

8. The shipping cover of claim 1 in which the cover is comprised of expanded styrene.

* * * * *